(12) United States Patent
Pashov

(10) Patent No.: US 10,353,737 B2
(45) Date of Patent: Jul. 16, 2019

(54) FAST AND SECURE REQUEST FORWARDING

(71) Applicant: Microsoft Technology Licensing, LLC, Redmond, WA (US)

(72) Inventor: Ivan D. Pashov, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 15/344,234

(22) Filed: Nov. 4, 2016

(65) Prior Publication Data

US 2018/0129533 A1 May 10, 2018

(51) Int. Cl.

| | |
|---|---|
| G06F 9/46 | (2006.01) |
| G06F 9/48 | (2006.01) |
| G06F 9/50 | (2006.01) |
| G06F 21/56 | (2013.01) |
| H04L 29/08 | (2006.01) |
| G06F 9/54 | (2006.01) |
| G06F 21/74 | (2013.01) |
| H04L 29/06 | (2006.01) |

(52) U.S. Cl.
CPC .......... *G06F 9/4881* (2013.01); *G06F 9/5027* (2013.01); *G06F 9/546* (2013.01); *G06F 21/56* (2013.01); *G06F 21/74* (2013.01); *H04L 67/02* (2013.01); *H04L 69/16* (2013.01)

(58) Field of Classification Search
CPC ......... G06F 3/061; G06F 9/5027; G06F 9/546
See application file for complete search history.

(56) References Cited

U.S. PATENT DOCUMENTS

| | | | |
|---|---|---|---|
| 6,976,260 B1 * | 12/2005 | Ault | G06F 9/546 710/54 |
| 7,257,819 B1 | 8/2007 | Dixo et al. | |
| 7,430,738 B1 * | 9/2008 | Sanders | G06F 9/5027 709/203 |
| 2003/0028669 A1 | 2/2003 | Batsleer et al. | |

(Continued)

OTHER PUBLICATIONS

Cannaday, Brandon, "Supercharge your Node.js Applications with Nginx", http://blog.modulus.io/supercharge-your-nodejs-applications-with-nginx, Published on: Jun. 9, 2016, 5 pages.

(Continued)

*Primary Examiner* — Dong U Kim

(57) ABSTRACT

Examples of the present disclosure relate to systems and methods for fast and secure request forwarding. A server application may receive an indication that there is a request in a queue available for processing. The server application may peek at the request, thereby accessing at least a portion of the request without removing the request from the queue. Based on the portion of the request, a determination may be made about whether the server application should process the request directly or transfer the request to a different module. If it is determined that the request should be processed directly, the entire request may be received from the queue and processed accordingly. However, if it is determined that the request should be forwarded, the request may be transferred to a secondary queue. A different module may then receive the request from the secondary queue and process the request accordingly.

19 Claims, 12 Drawing Sheets

(56) References Cited

U.S. PATENT DOCUMENTS

| | | | |
|---|---|---|---|
| 2003/0061378 A1 | 3/2003 | Mazzitelli | |
| 2004/0044760 A1* | 3/2004 | Deily | G06F 17/30893 709/223 |
| 2014/0317238 A1* | 10/2014 | Mazahir | H04L 67/02 709/219 |

OTHER PUBLICATIONS

"Connecting Apache Web Server to Tomcat and writing re-direct rules", http://community.jaspersoft.com/wiki/connecting-apache-web-server-tomcat-and-writing-re-direct-rules, Published on: Jun. 6, 2013, 2 pages.

Mitchell, Scott, "Serving Dynamic Content with HTTP Handlers", https://msdn.microsoft.com/en-in/library/ms972953.aspx, Published on: Apr. 2004, 20 pages.

Jana, Abhijit, "Beginner's Guide: How IIS Process ASP.NET", http://www.dotnetfunda.com/articles/show/821/beginners-guide-how-iis-process-aspnet-request, Published on: Mar. 14, 2010, 16 pages.

Vandebogart, et al., "Labels and Event Processes in the Asbestos Operating System", In Journal of ACM Transactions on Computer Systems, vol. 25, No. 4, Dec. 2007, 43 pages.

"IIS Request Processing", https://msdn.microsoft.com/en-us/library/ms524901(v=vs.90).aspx, Published on: Feb. 7, 2011, 2 pages.

Tomar, Nipun, "Web Farm and Web Garden", http://www.c-sharpcorner.com/uploadfile/nipuntomar/web-farm-and-web-garden/, Apr. 6, 2011, 7 pages.

"Overview of IIS 6.0 Architecture (IIS 6.0)", https://www.microsoft.com/technet/prodtechnol/WindowsServer2003/Library/IIS/93ddbb51-5826-4ebd-a434-24c5fd103d3a.mspx?mfr=true, Published on: Jul. 5, 2007, 5 pages.

"Is it possible to redirect another worker process in web garden", https://forums.iis.net/t/1207443.aspx, Published on: May 3, 2014, 3 pages.

\* cited by examiner

Traditional Server-Dependent Framework

Traditional Server-Dependent Framework

Traditional Server-Independent Framework

Traditional Server-Independent Framework

FAST AND SECURE REQUEST FORWARDING

BACKGROUND

Computer Networks

Computer networks connect a number of computing devices together and transmit data between computing devices. Generally, computing devices in a network may be categorized as servers and clients. Servers provide services to other devices, which may be referred to as clients. The same computing device may function as both a server and a client. A server may provide one or more services on the Internet. For example, a server device might have software running on it that allows it to act as a Web server, an e-mail server, and/or an FTP server. Client devices send requests to servers for particular services offered by the server. For example, a client may run web browser software that directs a request for a website to web server software running on the server device. The web server will process the request and return the requested website to the client.

The mechanisms of how such requests and responses are sent over the computer network is complex. Those of skill in the art use a conceptual model that breaks these functions into layers to help explain the complex interactions that occur when data is transmitted through a computer network. This layered model is sometimes referred to as the TCP/IP stack.

In the lowest layer, the network access layer, data is divided into packets of information that are transmitted as a signal across a physical medium connecting two devices. This layer is hardware-agnostic, meaning that the specific characteristics of the hardware implementations (e.g., a network interface controller (NIC)) are abstracted away by underlying device drivers. More specifically, a device driver provides standardized features and routines which may be used by other software layers without specific knowledge of the underlying hardware implementation. At the network access layer, information is received from the next highest abstraction layer, the internet layer, encapsulated (e.g., by wrapping the received information with control information) to form of one or more packets containing payload segments, and transmitted to a remote device across the physical connection medium.

The internet layer enables communication between devices across multiple networks using addressing and routing. At the internet layer, a device receives an internet protocol (IP) address which is hierarchical and enables another device to route data within the hierarchy accordingly. The IP address of a recipient device may be used by devices within the computer network to forward packets between devices along a path between the source and recipient devices. The internet layer encapsulates data from the next highest abstraction layer, the transport layer, which is then further encapsulated and transmitted by the link layer.

At the transport layer (e.g., TCP, UDP, etc.), data from the next highest layer, the application layer, is encapsulated. The transport layer provides a variety of high-level features, including segmentation, congestion control, and application addressing by way of port numbers. Data may be segmented such that one stream of information is divided into multiple parts for transmission across the network via the internet and link layers. Upon being received by the destination device, the data may then be recombined at the transport layer on the destination device. Port numbers are associated with data transmissions in order to classify data streams. This ensures that a communication may be specifically directed to the correct application or service on a computing device.

At the application layer, applications and services may listen for incoming communications on a specific port number (e.g., port 80 for HTTP requests, port 21 for FTP requests, etc.). Additionally, applications may open ports on a source computing device in order to transmit a request to a destination device. For example, a client device may open port 12211 in order to communicate with a web server operating on port 80 on a destination device. The destination device may then respond to port 12211 on the client device when transmitting a response to the request.

Internet of Things

The Internet of Things ("IoT") allows objects to be sensed and controlled with network infrastructure, such as clients and servers discussed in the preceding section. IoT devices include physical devices, objects, components, and other items that are embedded with electronics, software, sensors, and/or network connectivity to allow them to connect to networks and each other through the Internet of Things.

Web Frameworks

An application framework is a software library that provides a fundamental structure to support the development of applications for a specific environment. An application framework acts as the skeletal support to build an application. The intention of designing application frameworks is to lessen the general issues faced during the development of applications. This is achieved through the use of code that can be shared across different modules of an application.

A web framework is an application framework that is designed to support the development of web applications including web services, web resources and web APIs. Web frameworks are designed to alleviate the overhead associated with common activities performed in web development. For example, many web frameworks provide libraries for database access, templating frameworks and session management, and development of dynamic websites.

With conventional web frameworks (e.g., Asp.Net, Node.JS, PHP), each framework had to be able to integrate with every kind of web server (e.g., IIS, Apache, Nginx). These conventional frameworks will be referred to as "server-dependent frameworks." This was done by writing code specific to the APIs for "modules" exposed by each kind of web server. The modules extended the server application's ability to interpret and process computer languages.

For example, a particular webserver might have been capable of interpreting only HTML files. If a website developer wished to use a different computer language for the underlying code for the website under development, a module would have had to be used to enable the webserver to execute and process the other language used for that website (e.g., Ruby, PHP, etc.). As a result, web frameworks had to provide modules for a variety of server applications, each of which had to be tailored to the specific module application programming interface (API) provided by the developers of each of the specific server applications. Further, when operating in this configuration, when a webserver application that understood only HTML received a request for website written in PHP, it would have had to load the associated PHP module and provide the request to the PHP module. The PHP module would then have had to process the request and provide a response to the server application, after which the server application would transmit the response to the requestor.

The conventional server-dependent model had a number of problems. It required framework developers to create customized modules to ensure that the framework could be interpreted by the wide array of available server applications. Further, module APIs provided by a server application could vary depending on the version of the application, which required different versions of each module, thereby introducing yet another layer of complexity for both system administrators and framework developers.

A server-independent framework model was thus developed to minimize this tight integration between the frameworks and the web servers. In this model, the frameworks do not talk directly to the web server, but rather talk directly only to the sockets layer (e.g., WinSock on Windows) that implemented a rudimentary web server (e.g., a mini server or simplified server) that supports a minimal subset of HTTP/1.1. In this way, the framework was not tied to a particular kind of webserver, but could be used with multiple types of web servers. However, while this server-independent model gave the benefit of a framework independence from web-server type, it came at an enormous performance cost. That is, while the simplified server did not require customization for specific server applications, there was a large amount of overhead that resulted from the server application effectively repackaging received requests and responses as it relayed data between the requestor and the simplified server. In some cases, the time to receive and process a client request was 30 times slower than what was observed with the conventional server-dependent framework.

Further, the simplified server was not as secure as the server application. For example, the simplified server, which is not armored against malicious requests, was accessible by other processes running on the same server machine. As such, one malicious or exploited process could be used to take over more web sites running on the same machine using this mini-server. As a result, the simplified server introduced vulnerabilities within an otherwise secure system.

It is with respect to these and other considerations that examples have been made. Also, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Examples of the present disclosure are related to a secure request forwarding system for server-independent frameworks. A server application may receive an indication that there is a request available for processing. In an example, the request may be available in a queue. In some examples, the indication may be provided by an application layer listener that listens for requests and passes requests. The application layer listener may pass received requests, using a queue, to the server application for processing. Upon receiving the indication, attributes of the request may be examined. In some examples, the server application may "peek" at the request, thereby receiving access to at least a portion of the request without removing the request from the queue.

Based upon the examination of the request attributes, a determination may be made whether the server application should process the request directly or transfer the request to a different module. If it is determined that the request should be processed directly, the entire request may be received from the queue. The server application may then process the request and generate a response, after which the response may be transmitted to the requestor.

If, however, it is determined that the request should be transferred to a different module (e.g., a framework module), a redirect module may transfer the request to a second queue. In an example, the request may be removed from a main queue and placed into a second queue. In some examples, there may be multiple second queues, and the request may be sorted into a specific second queue based on the examined request attributes.

As a result of the transfer, a module may receive an indication that a request is available within a second queue. The module may receive the request from the second queue. Upon receiving the request, the module may process the request, thereby generating a response which may then be transmitted to the requestor.

BRIEF DESCRIPTION OF THE DRAWINGS

Non-limiting and non-exhaustive examples are described with reference to the following figures.

DETAILED DESCRIPTION

Various aspects are described more fully below with reference to the accompanying drawings, which form a part hereof, and which show specific exemplary aspects. However, examples may be implemented in many different forms and should not be construed as limited to the examples set forth herein. Accordingly, examples may take the form of a hardware implementation, or an entirely software implementation, or an implementation combining software and hardware aspects. The following detailed description is, therefore, not to be taken in a limiting sense.

Figure 1:
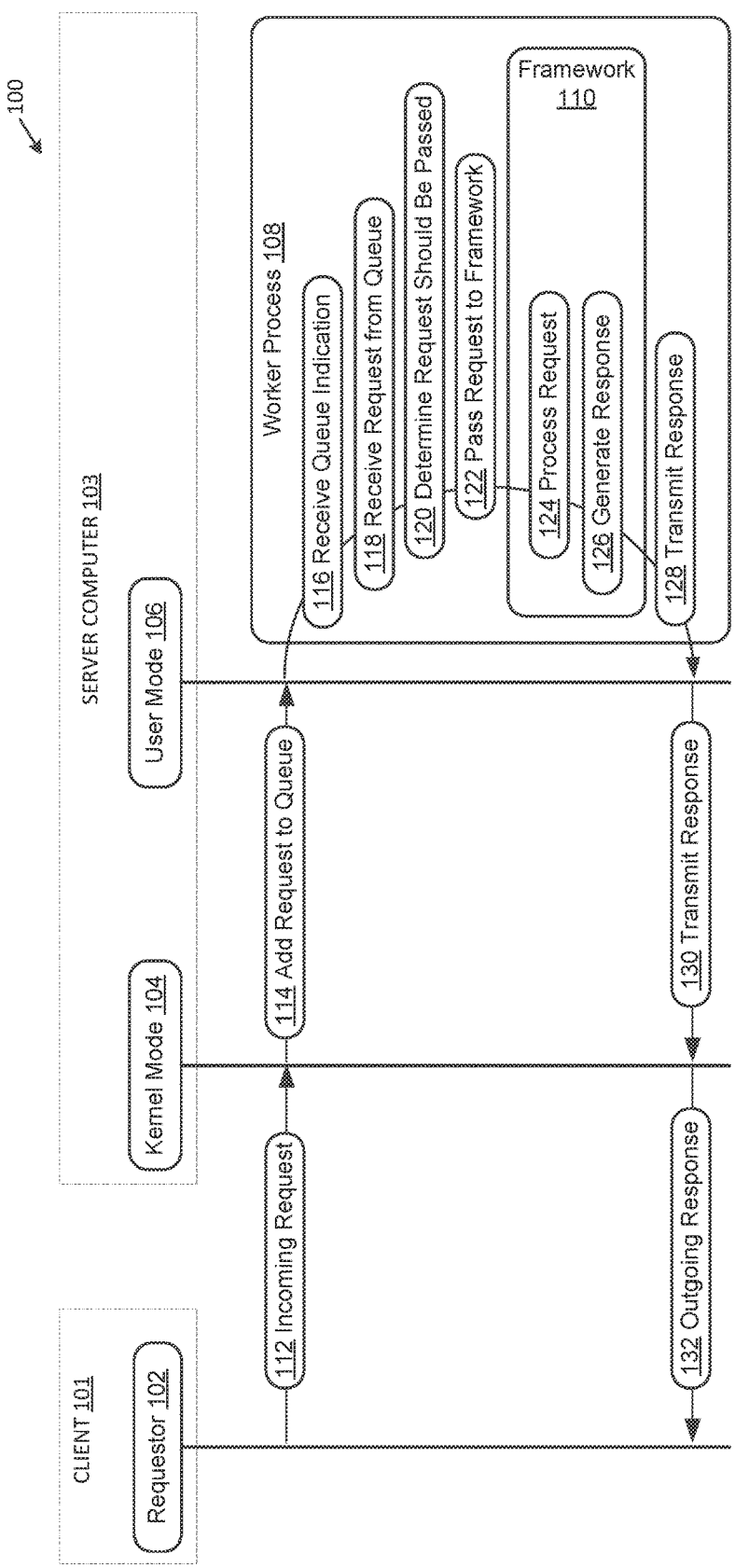
FIG. 1 depicts a method for performing request handling using a traditional server-dependent framework.

FIG. 1 depicts a method 100 for performing traditional request handling using a traditional server-dependent framework. In method 100, requestor 102 sends a request to and receives a response from a server 103, which comprises a kernel mode 104 and user mode 106. Requestor 102 is a computing device 101, such as a computer, mobile device (e.g., smartphone/phone, tablet, laptop, personal digital assistant (PDA), etc.) and/or any other electronic device. Kernel mode 104 is comprised of system-level modules and functionality. One or more application processes (e.g. worker process 108) execute within user mode 106. Worker process 108 is a server application, wherein worker process 108 further comprises a server-dependent framework 110. Server-dependent framework 110 enables worker process 108 to perform additional processing by way of integration with worker process 108 through a module API.

Flow begins at step 112 where an incoming request is transmitted by requestor 102 to kernel mode 104. At step 114, the request is added to a queue. As a result of adding the request to the queue, at step 116, worker process 108 receives a queue indication. The queue indication 116 notifies worker process 108 that there is a request in the queue. As a result of the queue indication, worker process 108 receives the request from the queue at step 118. After analyzing the request (e.g., evaluating which resource, e.g. website, is being requested), at step 120 worker process 108 determines that the request should be passed to a framework. More specifically, the worker process 108 determines that it is not able to natively process the request and that it must instead rely on a server-dependent framework (e.g., framework 110). As a result of the determination 120, the request is passed to framework 110 at step 122. At step 124, framework 110 processes the request. More specifically, framework 110 processes the request using its specialized knowledge of the resource specified by the request (e.g., a specific coding language not otherwise understood by worker process 108). As a result of processing the request, framework 110 generates a response at step 126, which is then passed to worker process 108. At step 128, worker process uses the response provided by framework 110 to transmit the response back to the requestor. As a result, the response is transmitted from user mode 106 to kernel mode 104 in step 130, and from kernel mode 104 to requestor 102 in step 132. Flow terminates at step 132. The problem with this system is that each particular kind of server requires a specialized framework.

Figure 2:
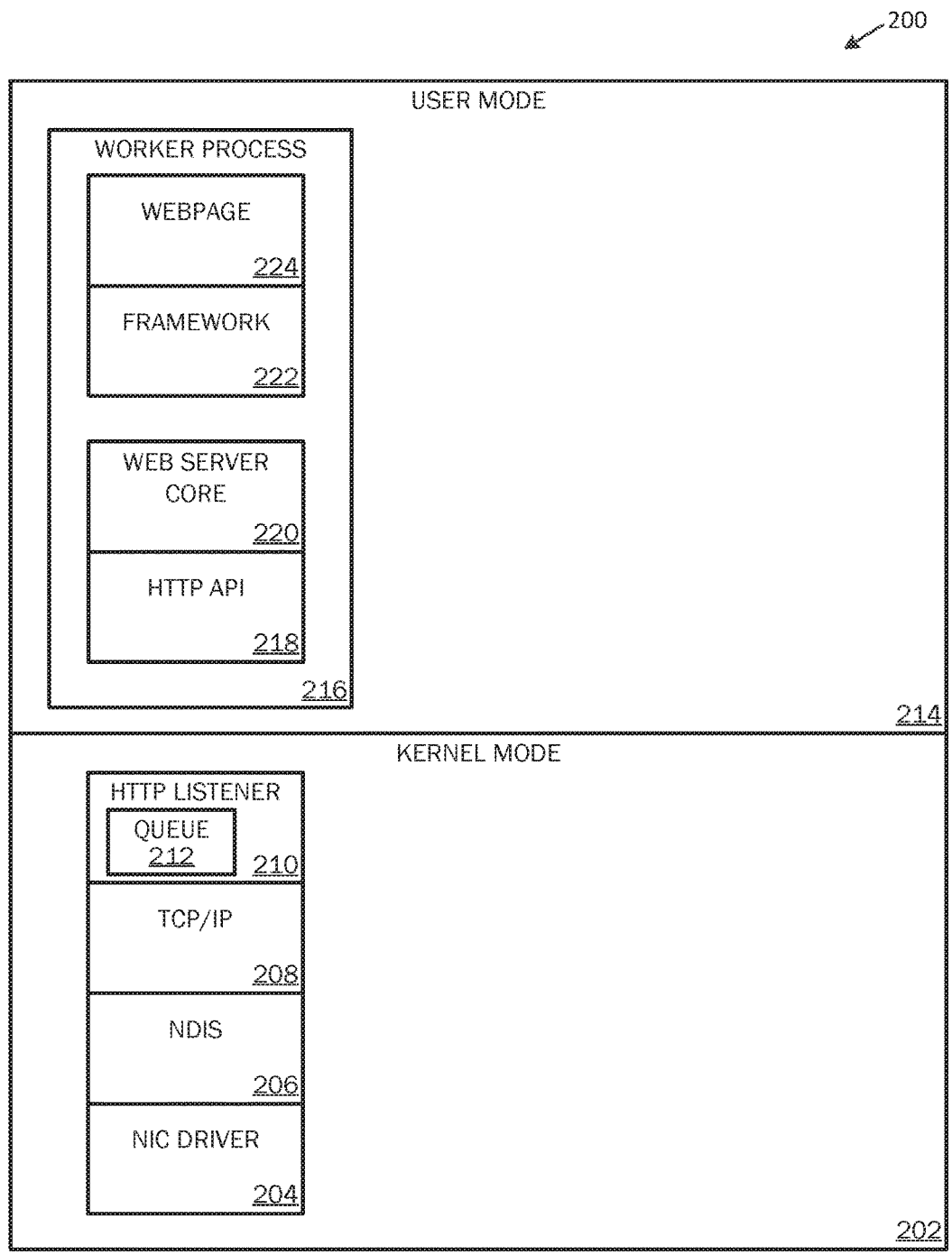
FIG. 2 depicts a system for performing request handling using a traditional server-dependent framework.

FIG. 2 depicts a system 200 for performing traditional request handling using the traditional server-dependent framework illustrated in FIG. 1. System 200 is comprised of kernel mode 202 and user mode 204. Kernel mode 204 is comprised of NIC driver 204, network driver interface specification (NDIS) 206, TCP/IP 208, and HTTP listener 210, which implements a queue 212. Together, components 204-210 process the transmission and receipt of data, placing incoming requests into queue 212. User mode 214 is comprised of worker process 216, which is further comprised of HTTP API 218, web server core 220, framework 222, and webpage 224. Webpage 424 is a resource for which a request is received. HTTP API 218 is used by web server core 220 to access queue 212. Web server core 220 also uses framework 222 to process webpage 224.

An HTTP request (e.g., incoming request 112) is received by NIC driver 204, and passed through NDIS 206 and TCP/IP 208 until reaching HTTP listener 210. HTTP listener 210 places the request into queue 212, which may be accessed by HTTP API 218. HTTP API 218 then takes the request from queue 212 and passes the request to web server core 220. Web server core 220 makes a determination that the request should be processed using framework 222, and passes the request to framework 222 accordingly. Framework 222 then accesses and interprets webpage 224 in order to process the request and generate a response. Framework 222 then provides its generated response to web server core 220, which in turn uses HTTP API 218 to transmit the response through TCP/IP 208, NDIS 206, and NIC driver 204, until ultimately reaching the initial requestor (e.g., requestor 102).

Figure 3:
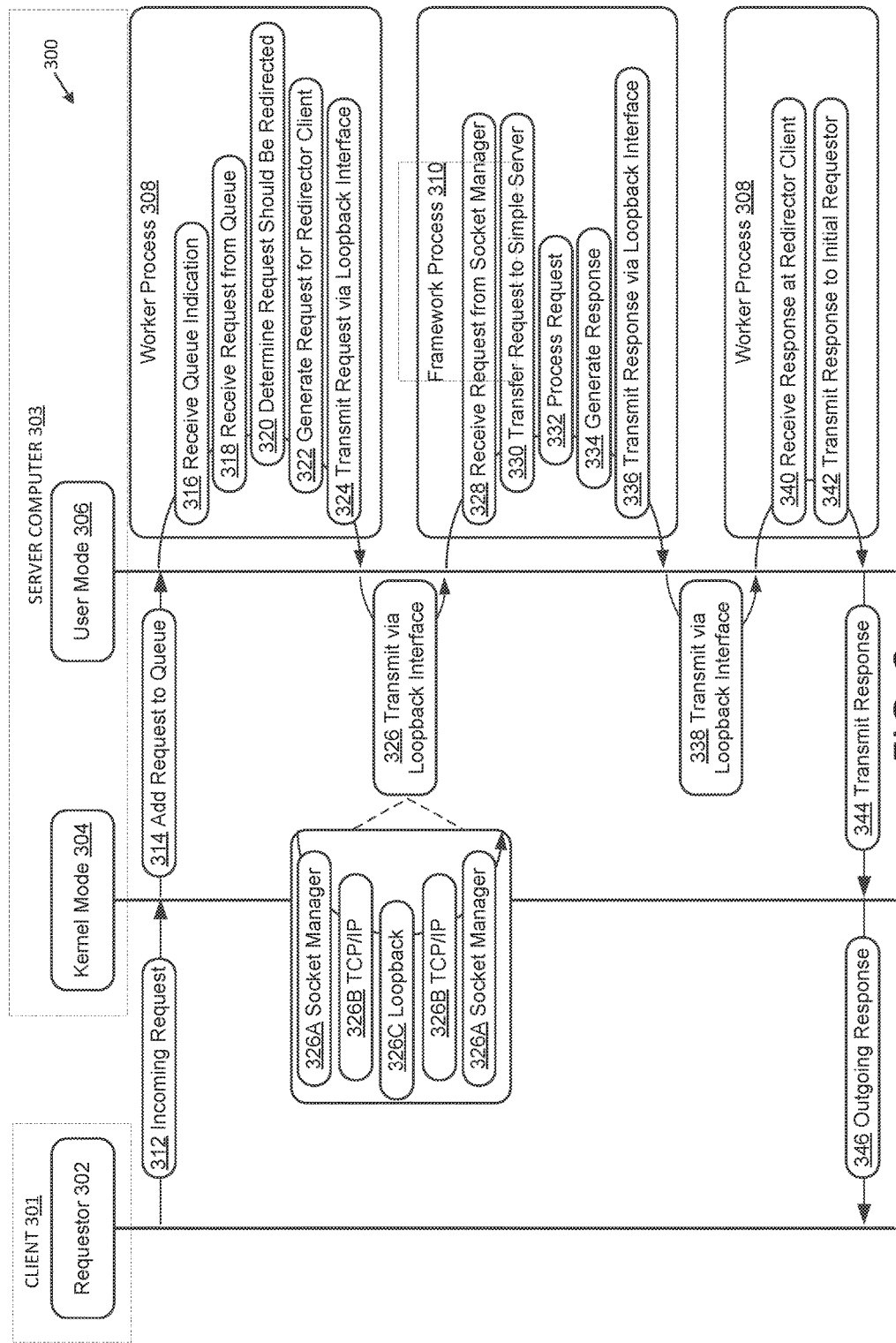
FIG. 3 depicts a method for performing request handling using a traditional server-independent framework.

FIG. 3 depicts a method 300 for performing traditional request handling using a traditional server-independent framework. A standalone executable processes requests via a simplified server (e.g., a simplified HTTP server). The simplified server may be configured to be accessible only via the device's loopback network interface. The loopback network interface ("loopback interface") provides access to a local network which is accessible only by the computing device. Consequently, the computing device is the only device available within the loopback network. As a result, data may only be transmitted to and from applications and services that are executing locally on the computing device. The server application may then be configured to redirect requests to and from the simplified server when the server application determines that the request should be processed by the simplified server. As a result, a request may be redirected over the loopback interface by the server application to the simplified server. This means that the request must once again travel down the application layer and the transport layer, across the loopback interface, back up the transport and application layers, where it is finally received by the simplified server.

For example, a webserver may receive a request for a website written in JavaScript. As a result, the webserver may forward the request to a simplified HTTP server provided by a Node.JS process. Forwarding the request may comprise repackaging the initial HTTP request as a new HTTP request and transmitting the new request to the simplified HTTP server via the loopback interface. Upon receiving the request, Node.JS may process the request and generate a response. The response may then be transmitted back to the webserver in the form of an HTTP response. The webserver may receive the HTTP response from the simplified HTTP server, repackage the response in a new HTTP response associated with the initial HTTP request, and transmit the new HTTP response to the requestor.

Unlike method 100 shown in FIG. 1, method 300 includes a server-independent framework that may be used with multiple different kinds of servers. However, as shown below, method 300 is very slow and cumbersome because it requires two extra trips from the kernel mode 304 to the user mode 306 (using a loopback interface) as compared to method 100 before the response can be generated.

Method 300 also illustrates sending requests from requestor 302, such as a client 301, to a server 303 comprising a kernel mode 304 and user mode 306. Kernel mode 304 is comprised of system-level modules and functionality. One or more application processes (e.g. worker process 308 and framework process 310) execute within user mode 306. Worker process 308 is a server application and framework process 310 process request from worker process 308 using its unique knowledge of a framework (e.g., a computer language).

Flow begins at step 312 where an incoming request is transmitted by requestor 302 to kernel mode 304. At step 314, the request is added to a queue. As a result of adding the request to the queue, at step 316, worker process 308 receives a queue indication. The queue indication notifies worker process 308 that there is a request in the queue. As a result of the queue indication, worker process 308 receives the request from the queue at step 318. After analyzing the request (e.g., evaluating which resource is being requested), at step 320 worker process 308 determines that the request should be passed to a framework. The determination is comprised of determining that worker process 308 is not able to natively process the request and must instead rely on a framework (e.g., framework process 310). As a result of the determination, at step 322, a new request is generated for transmission using a redirector client.

At step 324, the new request is transmitted to framework process 310 using a loopback interface. Transmitting the request via the loopback interface occurs at step 326, which is comprised of several subparts. The request first traverses socket manager 326A, which then communicates the request via TCP/IP 326B to loopback interface 326C. Loopback interface 326C then transmits the request back up the chain, via TCP/IP 326B until reaching socket manger 326A. Socket manager 326A determines that the request is directed to framework process 310.

At step 328, framework process 310 receives the request from socket manager 326A and transfers the request to a simple server embedded within framework process 310. At step 332, the request is processed using specialized knowledge contained within framework process 310 (e.g., knowledge relating to a specific coding language not otherwise understood by worker process 208). As a result of processing the request, framework process 310 generates a response at step 334, which is then transmitted via the loopback interface at step 338.

Similar to step 326, transmission via the loopback interface is comprised of transmitting the request across the loopback interface using a socket manager and TCP/IP implementation (e.g., 326A-326C). At step 340, worker process 308 receives the response generated by framework process 310. At step 342, worker process 308 may then finally transmit the response received from framework process 310 to the initial requestor. The request is then sent from user mode 306 to kernel mode 304 at step 344, after which it is transmitted from kernel mode 304 to requestor 302 in step 346. Flow then terminates.

Figure 4:
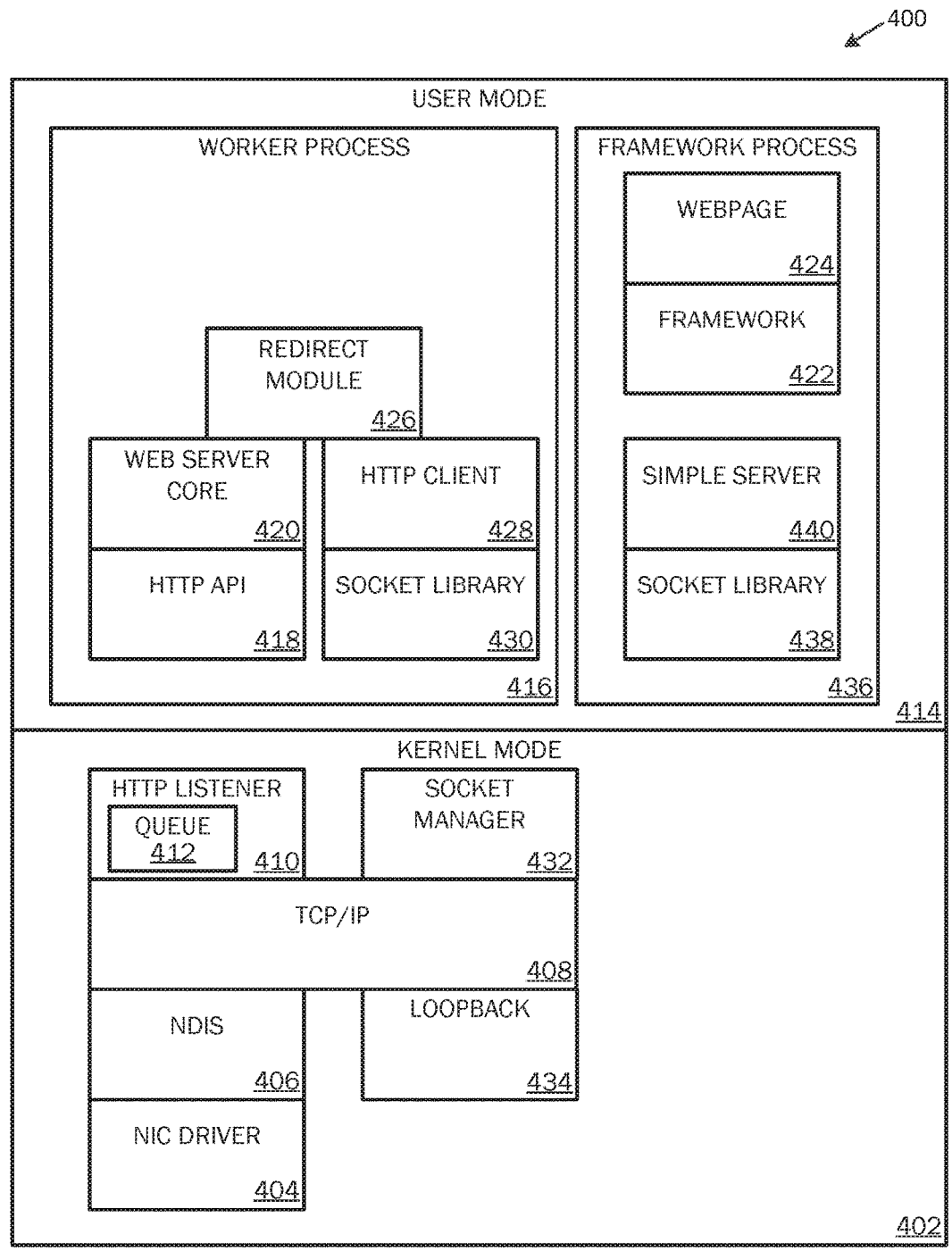
FIG. 4 depicts a system for performing request handling using a traditional server-independent framework.

FIG. 4 depicts a system 400 for performing traditional request handling using the traditional server-independent framework shown in FIG. 3. System 400 is comprised of kernel mode 402 and user mode 404. Kernel mode 404 is comprised of NIC driver 404, NDIS 406, TCP/IP 408, and HTTP listener 410, which is further comprised of queue 412. Kernel mode 402 is further comprised of socket manager 432, and loopback 434, which are joined via TCP/IP 408. Together, components 404-410 process the transmission and receipt of data across a computer network, placing incoming requests into queue 412. Similarly, components 432, 408, and 434 process the transmission and receipt of data across a loopback interface.

User mode 414 is comprised of worker process 416, which is further comprised of HTTP API 418, web server core 420, redirect module 426, HTTP client 428, and socket library 430. User mode 414 is also comprised of framework process 436, which is further comprised of socket library 438, HTTP server 440, framework 422, and webpage 424. Webpage 424 is a resource for which a request is received. HTTP API 418 is used by web server core 420 to access queue 412. Web server core 420 uses redirect module 426, http client 428, and socket library 430 to forward requests directed to framework 422 across socket manager 432, TCP/IP 408, and loopback 434 to framework process 436. As a result, framework process 436 uses socket library 438 to receive the forwarded request from socket manager 432, which is then processed by HTTP server 440 in conjunction with framework 422 to generate a response.

An HTTP request (e.g., incoming request 312) is received by NIC driver 404, and passed through NDIS 406 and TCP/IP 408 until reaching HTTP listener 410. HTTP listener 410 places the request into queue 412, which may be accessed by HTTP API 418. HTTP API 418 then takes the request from queue 412 and passes the request to web server core 420. Web server core 420 makes a determination that the request should be processed using framework 422. As a result, the request is passed to redirect module 426, which uses HTTP client 428 and socket library 430 to transmit a new request across the loopback interface. The request is received by socket manager 432 and transmitted by TCP/IP 408 to loopback 434, where it again passes through TCP/IP 408 to socket manager 432. Socket library 438 then receives the request from socket manager 438, after which is passes the new request to HTTP server 440.

HTTP server 440 passes the new request to framework 422, which accesses and interprets webpage 424 in order to process the request and generate a response. Framework 422 then provides its generated response to HTTP server 440. The response is then communicated from HTTP server 440 to HTTP client 428 by traversing socket library 438, socket manager 432, TCP/IP 408, loopback 434, TCP/IP 408, socket manager 432, and socket library 430. Once the response is received by HTTP client 428, redirect module 426 provides the response to web server core 420, which repackages the response and transmits the response to the initial requestor via TCP/IP 408, NDIS 406, and NIC driver 404.

Figure 5A:
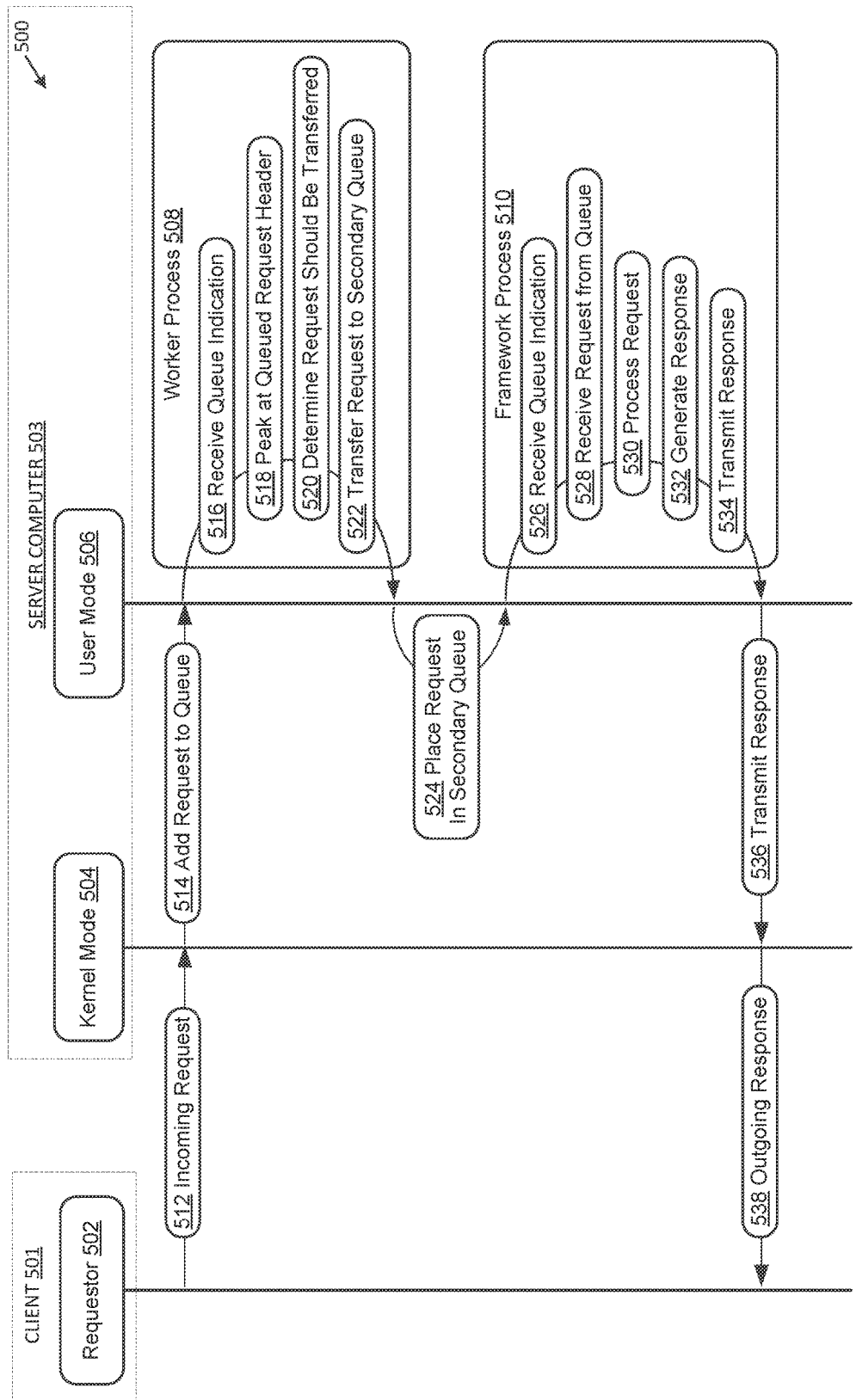
FIGS. 5A and 5B illustrate an exemplary method for performing fast and secure request forwarding using server-independent framework in accordance with embodiments of the present invention.
Figure 5B:
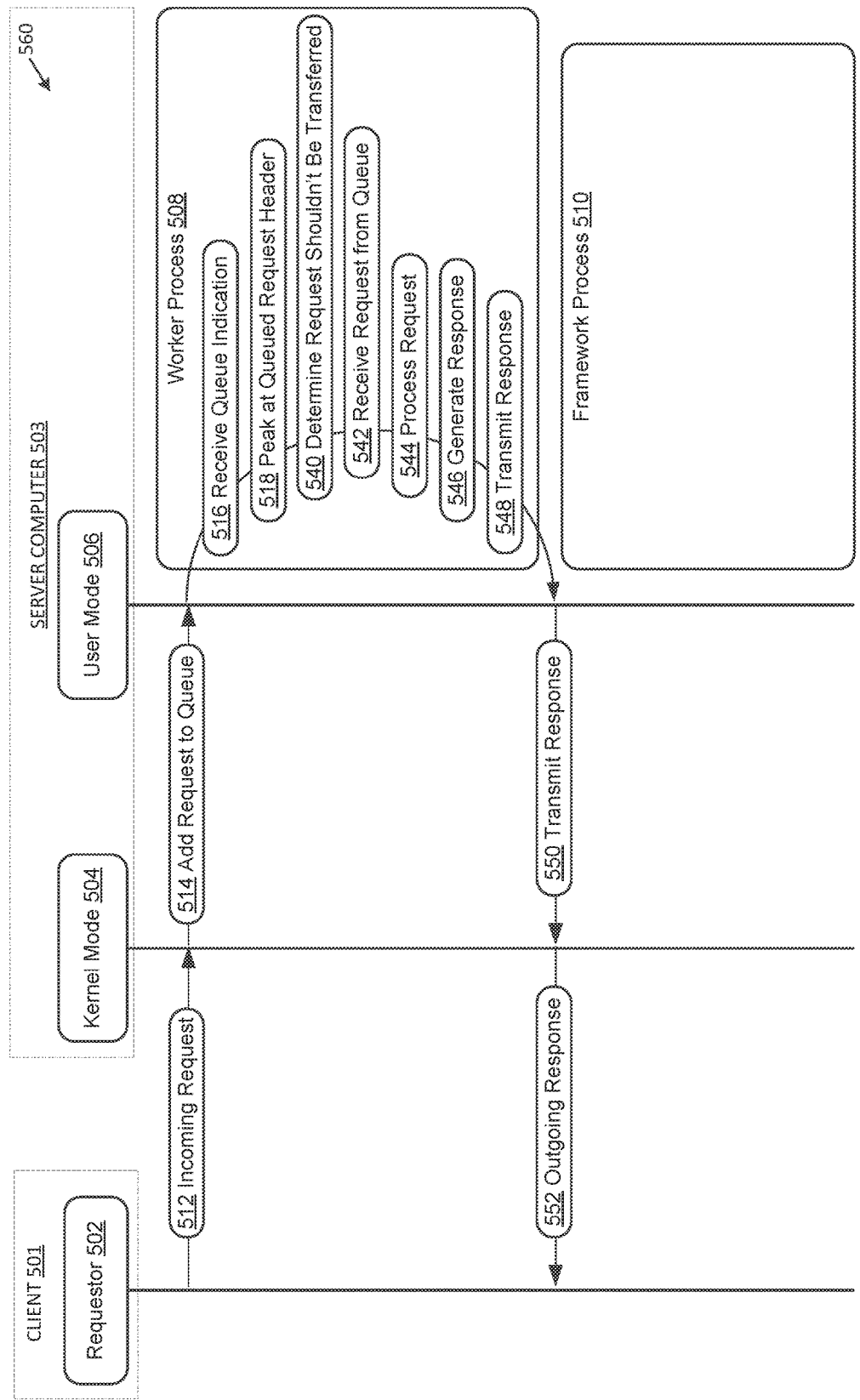
Figure 6:
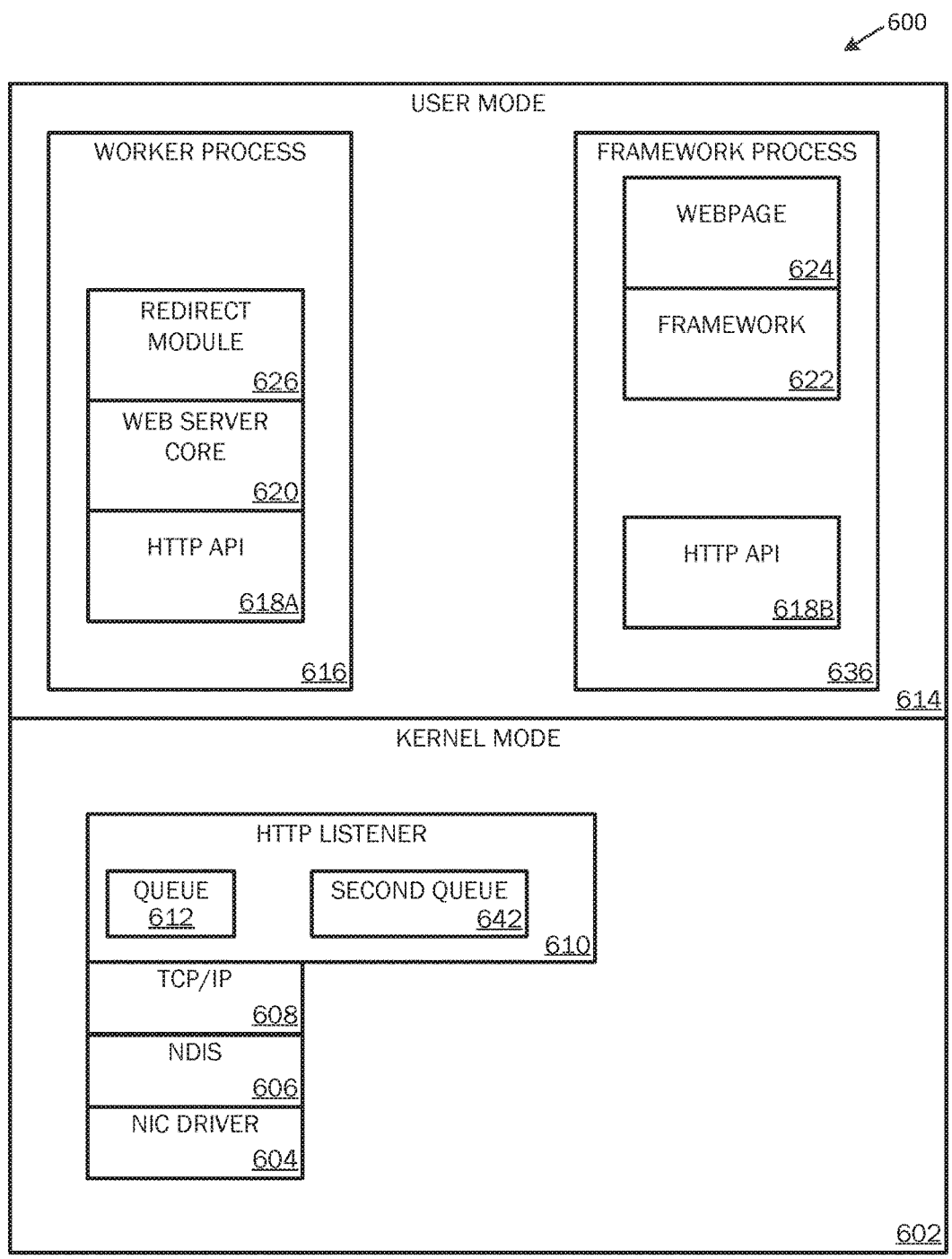
FIG. 6 illustrates an exemplary system for performing fast and secure request forwarding in accordance with embodiments of the present invention.

FIGS. 5A, 5B, and 6 illustrate exemplary methods and systems for performing fast and secure request forwarding in accordance with embodiments of the present invention.

Method 500 may be performed in a system comprising requestor 502 and server 503 with a kernel mode 504 and user mode 506. Requestor 502 may be a computing device, such as a computer, mobile device (e.g., smartphone/phone, tablet, laptop, personal digital assistant (PDA), etc.) and/or any other electronic device. For example, the requestor 502 may be an IoT (Internet of Things) device. Kernel mode 504 may comprise system-level modules and functionality, including, but not limited to, hardware drivers, network interface APIs, and other network modules or abstraction layers. One or more application processes may execute within user mode 506. Application processes comprise a primary process, such as worker process 508, and a secondary process, such as framework process 510. The primary and secondary application processes may be server processes, used to process and respond to requests from requestor 502.

Flow begins at step 512 where an incoming request may be transmitted by requestor 502 to kernel mode 504. In some examples, the incoming request may be a request for resources made available by worker process 508 or framework process 510, executing within user mode 506. In some examples, the request may be an HTTP request for a webpage, wherein the webpage is coded in a computer language that may be interpreted by framework process 510. One of skill in the art will appreciate that the incoming request may be any other kind of request transmitted to a computer device by a requestor over a computer network.

At step 514, the request may be added to a queue. In some examples, adding the request to the queue may comprise processing the request as it traverses the various abstraction layers discussed above. More specifically, the request may traverse the link layer, the internet layer, and the transport layer, until it reaches the application layer. The application layer may process the request by examining its attributes (e.g., a target port number and a target IP address) and, based on these attributes, place the request into an appropriate application listener queue. In other examples, the request may traverse an NIC driver, an API for interfacing with the NIC (e.g., Ndis.sys), and an internet protocol implementation suite (e.g., Tcpip.sys), where it may ultimately reach an application layer listener (e.g., Http.sys), which may add the request to the queue.

As a result of adding the request to the queue, worker process 508 may receive a queue indication at step 516. The queue indication may notify worker process 508 that there is a request in the queue. In some examples, the indication may be provided by an application layer listener. The application layer listener may be an HTTP listener (e.g., Http.sys). The indication may be received by an application layer API (e.g., Httpapi.dll).

As a result of the queue indication, worker process 508 may peek at the queued request at step 518, wherein peeking at the queued request comprises accessing request headers. In some examples, the request headers may provide an indication as to the subject of the request (e.g., HTTP headers indicating which resource was requested). For example, the header may indicate that the resource requested is a dynamic webpage or a static webpage. More specifically, the path of the requested resource may be examined to determine whether the request is for a dynamic resource (e.g., stored in a directory which stores executable or dynamic resources, such as "/cgi-bin/") or a static resource (e.g., stored in a directory which stores static resources, such as "/static/"). Similarly, the file extension of the requested resource may be examined to determine whether a requested resource is dynamic or static. As an example, a file ending in ".aspx" may be determined to be a dynamic resource, whereas a file ending in ".jpg" may be determined to be a static resource. In other examples, examining the request header may comprise evaluating a request verb specified within the request header (e.g., a GET or HEAD request verb versus a POST request verb within an HTTP request, the SEARCH verb for a WebDAV request, etc.).

In some examples, the request header may be examined to determine additional attributes including a classification associated with the requested resource (e.g., confidentiality level, business impact, associated retention policy, etc.). The request header may also be scanned to determine whether the request is malicious (e.g., part of a distributed denial of service attack, associated with computer malware, etc.). In another example, the request header may be passed to a module which may then examine the request header and respond with an indication as to whether the request should be transferred. The module may perform additional or similar analysis as discussed above, or may comprise functionality specified by a third party. Based on the contents of the request header, a determination may be made at step 520 to transfer the request.

At step 522, the request may be transferred from the main queue to a second queue. In some examples, there may be multiple second queues, and the request may be sorted into a specific second queue based on the examined request attributes. At step 524, the request is transferred to a second queue by a module within kernel mode 504. In some examples, access to the second queue may be possible from applications and services within user mode 506, or a second queue may be stored in user mode 506. One of skill in the art will appreciate that data structures and processing components may be divided in any manner between kernel mode 504 and user mode 506 without departing from the spirit of this disclosure.

In other examples, the second queue may be protected or otherwise inaccessible to other components within the computing device. More specifically, the component which processes incoming requests and adds them to the main queue may be unable to similarly add requests to a second queue. Only the worker process 504 may write to the second queue. In embodiments, read-access to the secondary queue may also be restricted to the framework process. For example, a framework process that runs one website will not be able to read incoming requests for a separate website. As a result, processes and components that access a second queue can be assured as to the source of the data and be no more vulnerable than compared to the situation when it was directly hosted inside of the main worker process. By contrast, a loopback interface may permit a wide array of components within the computing device to transmit or receive data.

Returning to method 500, at step 526, framework process 510 may receive a queue indication, notifying framework process 510 that there is a request available in the second queue. At step 528, framework process may receive the request from the second queue, after which, at step 530, the request may be processed. In some examples, processing the request may comprise accessing the resource specified within the request (e.g., a webpage). The contents of the resource may be interpreted or executed by framework process 510. In some examples, framework process 510 may also evaluate or incorporate additional information provided within the request when processing the request (e.g., incorporating data provided within the request in the form of an HTTP POST request).

At step 532, a response may be generated as a result of the processing performed in step 530. The response may be transmitted at step 534, wherein framework process 510 within user mode 506 transmits the response to requestor 502. As a result, in step 536, kernel mode 504 may then receive the response from user mode 506 and further transmit the response to requestor 502. In some examples, transmitting the response to requestor 502 may further comprise encapsulating the request via the application layer, the transport layer, the internet layer, and the link layer. In another example, the request may traverse an internet protocol implementation suite (e.g., Tcpip.sys), an API for interfacing with an NIC (e.g., Ndis.sys), and the NIC driver. Finally, at step 538, the response may be transmitted from kernel mode 504 to requestor 502. Flow terminates after step 538.

FIG. 5B illustrates an exemplary method 560 for performing fast and secure request forwarding where the request is processed by the worker process 508 instead of the framework process 510.

Flow begins at step 512 where an incoming request may be transmitted by requestor 502 to kernel mode 504. In some examples, the incoming request may be a request for resources made available by worker process 508 or framework process 510, executing within user mode 506. In some examples, the request may be an HTTP request for a webpage, wherein the webpage is coded in a computer language that may be interpreted by framework process 510. One of skill in the art will appreciate that the incoming request may be any other kind of request transmitted to a computer device by a requestor over a computer network.

At step 514, the request may be added to a queue. In some examples, adding the request to the queue may comprise processing the request as it traverses the various abstraction layers discussed above. More specifically, the request may traverse the link layer, the internet layer, and the transport layer, until it reaches the application layer. The application layer may process the request by examining its attributes (e.g., a target port number and a target IP address) and, based on these attributes, place the request into an appropriate application listener queue. In other examples, the request may traverse an NIC driver, an API for interfacing with the NIC (e.g., Ndis.sys), and an internet protocol implementation suite (e.g., Tcpip.sys), where it may ultimately reach an application layer listener (e.g., Http.sys), which may add the request to the queue.

As a result of adding the request to the queue, worker process 508 may receive a queue indication at step 516. The queue indication may notify worker process 508 that there is a request in the queue. In some examples, the indication may be provided by an application layer listener. The application layer listener may be an HTTP listener (e.g., Http.sys). The indication may be received by an application layer API (e.g., Httpapi.dll).

As a result of the queue indication, worker process 508 may peek at the queued request at step 518, wherein peeking at the queued request comprises accessing request headers. In some examples, the request headers may provide an indication as to the subject of the request (e.g., HTTP headers indicating which resource was requested). Based on the contents of the request header, a determination may be made at step 540 to process the request using worker process 508 instead of transferring the request for processing to framework process (e.g., framework process 510).

At step 542, worker process 508 may receive the request from the second queue, after which, at step 544, the request may be processed. In some examples, processing the request may comprise accessing the resource specified within the request. The contents of the resource may be interpreted or executed by worker process 508. In some examples, worker process 508 may also evaluate or incorporate additional information provided within the request when processing the request (e.g., incorporating data provided within the request in the form of an HTTP POST request).

At step 546, a response may be generated as a result of the processing performed in step 544. The response may be transmitted at step 548, wherein worker process 508 within user mode 506 transmits the response to requestor 502. As a result, in step 550, kernel mode 504 may then receive the response from user mode 506 and further transmit the response to requestor 502. In some examples, transmitting the response to requestor 502 may further comprise encapsulating the request via the application layer, the transport layer, the internet layer, and the link layer. In another example, the request may traverse an internet protocol implementation suite (e.g., Tcpip.sys), an API for interfacing with an NIC (e.g., Ndis.sys), and the NIC driver. Finally, at step 552, the response may be transmitted from kernel mode 504 to requestor 502. Flow terminates after step 552. In alternative embodiments, methods 500 and 560 may be performed by an IoT device. These methods would operate as described above with reference to FIGS. 5A and 5B, but the worker process 504 may be an IoT device process for processing generic requests and managing the IoT device, and the framework process 510 may be a software plug-in for managing customized functions or components of the IoT device. The worker process may peek at all requests and, based on this peek, determine whether the worker process should handle the requests at a minimal cost (both runtime, but also lines of code written) or whether the request should be forwarded to a framework process. The framework process may be a vendor specific plug-in component which, using aspects disclosed herein, is integrated with the worker process and, by extension, the related underlying infrastructure provided by the IoT device.

In other embodiments, the primary process comprises security (e.g. anti-virus) software and the secondary process comprises a handler. Like described above in FIGS. 5A and 5B, the primary process peeks at requests in the first queue, drops the unsafe ones and forwards the safe ones to a second queue to be processed. Using the delegation to a second queue is orders of magnitude faster than conventional systems and provides protection from sloppy/untrusted code that can be executed in the actual web page.

In yet other embodiments, the primary process relates to document classification that determines confidentiality, business impact, retention policy or the like, and forwards the request correspondingly to protected vs. generic handling process as described in FIGS. 5A and 5B.

FIG. 6 illustrates an exemplary system 600 for performing fast and secure request forwarding using a server-independent framework illustrated in FIGS. 5A and 5B. System 600 comprises a server, such as server 503, with kernel mode 602 and user mode 604. Kernel mode 604 may be comprised of NIC driver 604, NDIS 606 (e.g., Ndis.sys), TCP/IP 608 (e.g., Tcpip.sys), and HTTP listener 610 (e.g., Http.sys), which is further comprised of queue 612 and second queue 64 and second queue 642. Together, components 604-610 may process the transmission and receipt of data across a computer network, placing incoming requests into queue 612. Kernel mode 602 may further be comprised of second queue 642, which may be managed by same or similar entity as the first queue 612. In some examples, queue 642 may be inaccessible from components 604-608 and may be managed by HTTP listener 610. In other examples, queue 612 may be further inaccessible from HTTP listener 610 and may be instead managed by one or more components within user mode 614. One of skill in the art will appreciate that a variety of access schemes may be employed for managing second queue 642 without departing from the spirit of this disclosure.

User mode 614 may be comprised of worker process 616, which may be further comprised of HTTP API 618A (e.g., Httpapi.dll), web server core 620, and redirect module 626. User mode 614 may also be comprised of framework process 636, which may be further comprised of HTTP API 618B (e.g., Httpapi.dll), framework 622, and webpage 624. Webpage 624 may be a resource for which a request is received. HTTP API 618A may be used by web server core 620 to access queue 612. Similarly, HTTP API 618B may be used to access second queue 642. Web server core 620 may use redirect module 626 to transfer requests held in queue 612 to second queue 642.

An HTTP request (e.g., incoming request 512) may be received from a requestor by NIC driver 604, and passed through NDIS 606 and TCP/IP 608 until reaching HTTP listener 610. HTTP listener 610 may place the request into queue 612, which may be accessible by HTTP API 618A. Web server core 620 may use HTTP API 618A to peek at the request stored in queue 612. In some examples, peeking at the request may comprise accessing headers associated with the request. The request headers may provide an indication as to the subject of the request (e.g., HTTP headers indicating which resource was requested). Further, after examining one or more requests coming to the primary queue, the worker process may detect one or more common patterns associated with requests that should go to the secondary queue and instruct the listener (e.g. HTTP listener 610) to forward these requests directly the second queue going forward.

As a result of peeking at the request headers, web server core 620 may determine that the request should be handled by framework process 636 (e.g., because the request is for a resource in a computer language that worker process 616 does not understand, because the request is for a resource which is determined to require special or protected handling, etc.). As a result, web server core may use redirect module 626 to transfer the request from queue 612 to second queue 642. In some examples, there may be multiple second queues, and the request may be sorted into a specific second queue based on the examined request attributes. Further, access to second queue 642 may be possible from applications and services within user mode 614, or second queue 642 may be stored within user mode 614. One of skill in the art will appreciate that components 604-612 and component 642 may be divided in any manner between kernel mode 602 and user mode 614 without departing from the spirit of this disclosure.

Framework process 636 may receive an indication that the request has been placed in second queue 642. As a result of this indication, HTTP API 618B may be used by framework process 636 to receive the request. Framework 622 may then process the request, in conjunction with the contents of webpage 624, in order to generate a response. In some examples, the contents of webpage 624 may be interpreted or executed by framework 622. Framework 622 may also evaluate or incorporate additional information provided within the request when processing the request (e.g., incorporating data provided within the request in the form of an HTTP POST request). Framework process 636 may then transmit the generated response back to the requestor. In some examples, transmitting the response may comprise encapsulating the request via the application layer, the transport layer, the internet layer, and the link layer, as discussed above. In another example, the request may traverse an internet protocol implementation suite (e.g., Tcpip.sys), an API for interfacing with an NIC (e.g., Ndis.sys), and the NIC driver.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
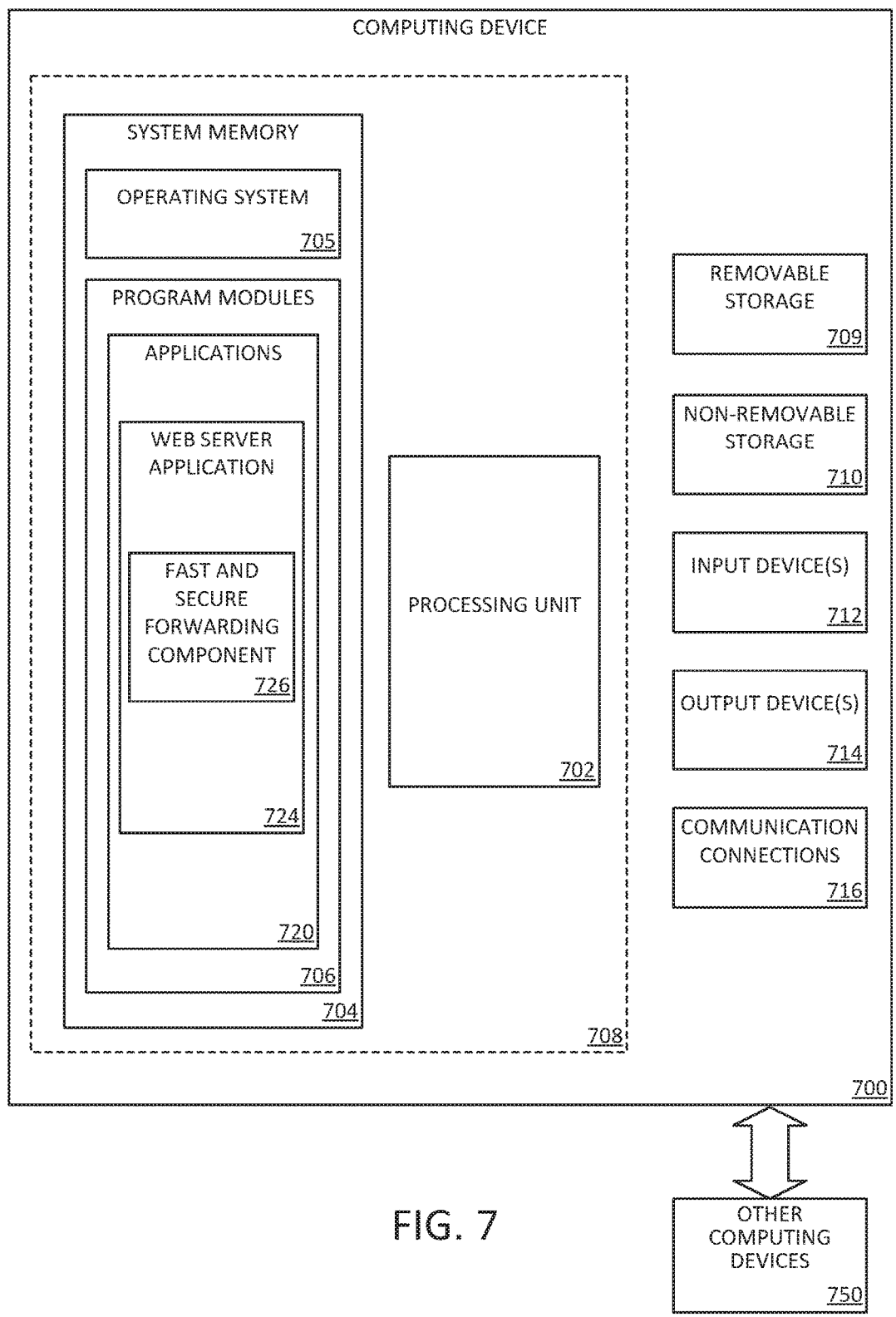
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above, including the client computing devices 501 and the server computing device 501 and 600. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for performing the various aspects disclosed herein such as a web server application 724, which employs a server-independent framework and includes a fast and secure forwarding component 726. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
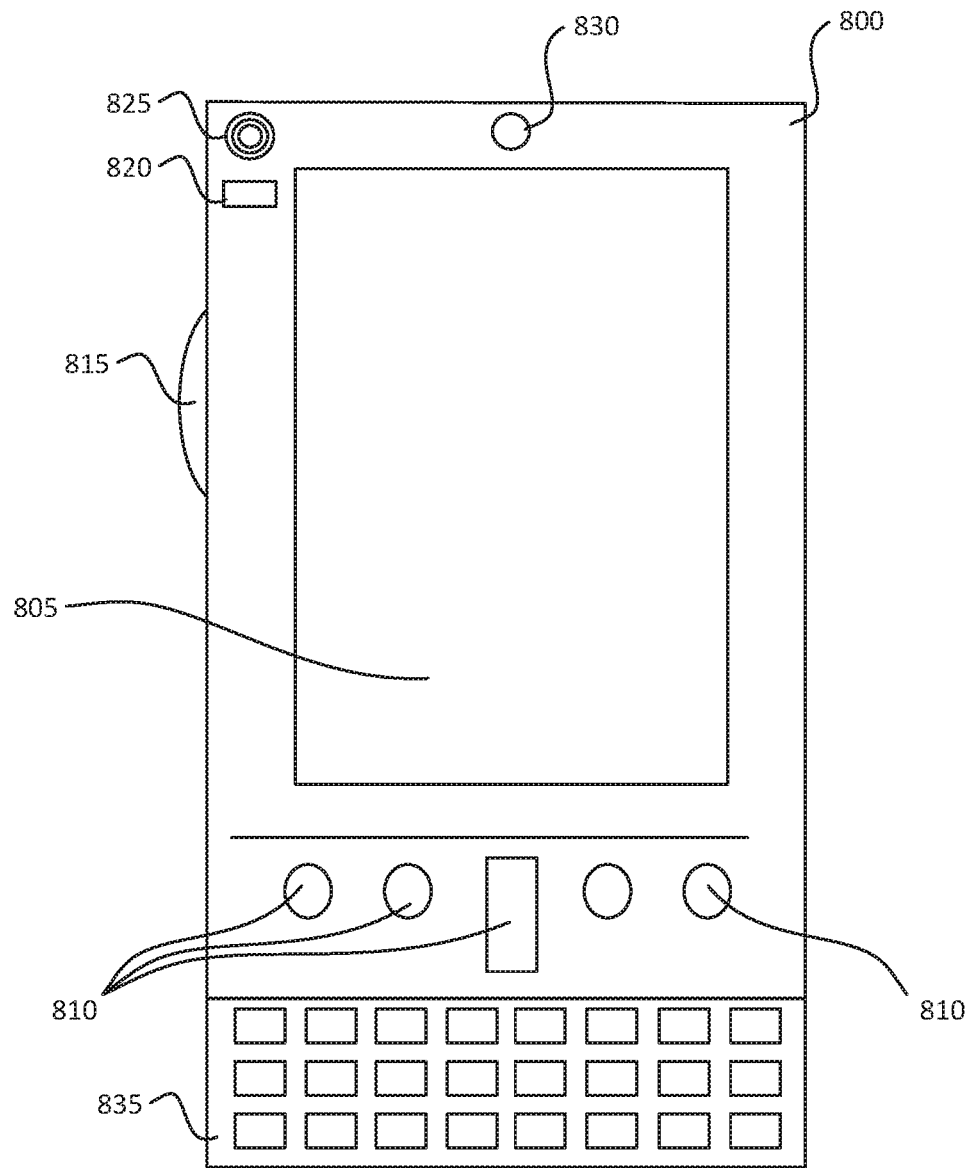
FIGS. 8A and 8B are simplified block diagrams of a mobile computing device with which aspects of the present disclosure may be practiced.
Figure 8B:
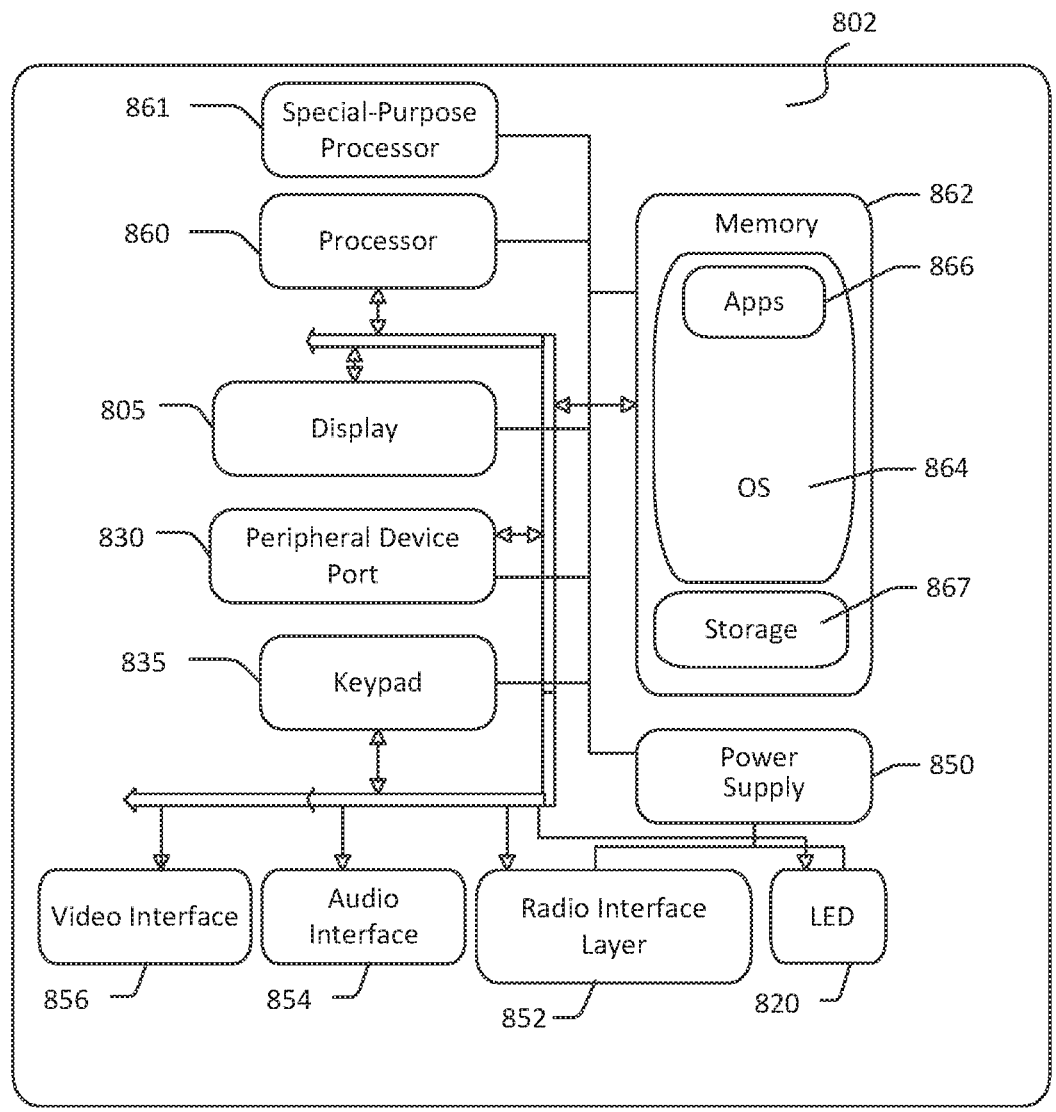

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
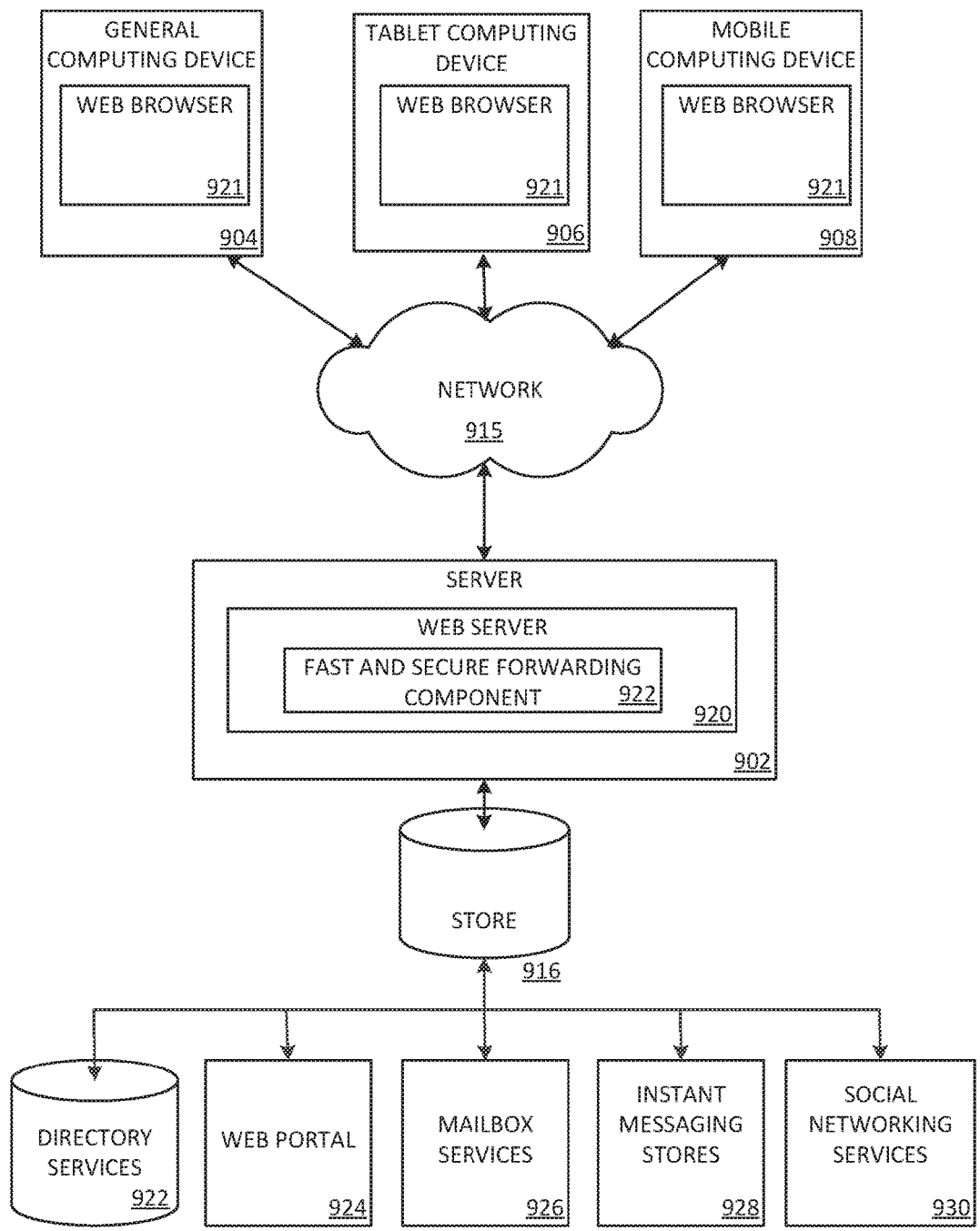
FIG. 9 is a simplified block diagram of a distributed computing system in which aspects of the present disclosure may be practiced.

FIG. 9 illustrates one aspect of the architecture of a system for processing requests received at a computing system, such as a server, from a client, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. A web browser 921 may be employed by a client that communicates with server device 902, and/or web server 920 with a fast and secure forwarding component 922 at the server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
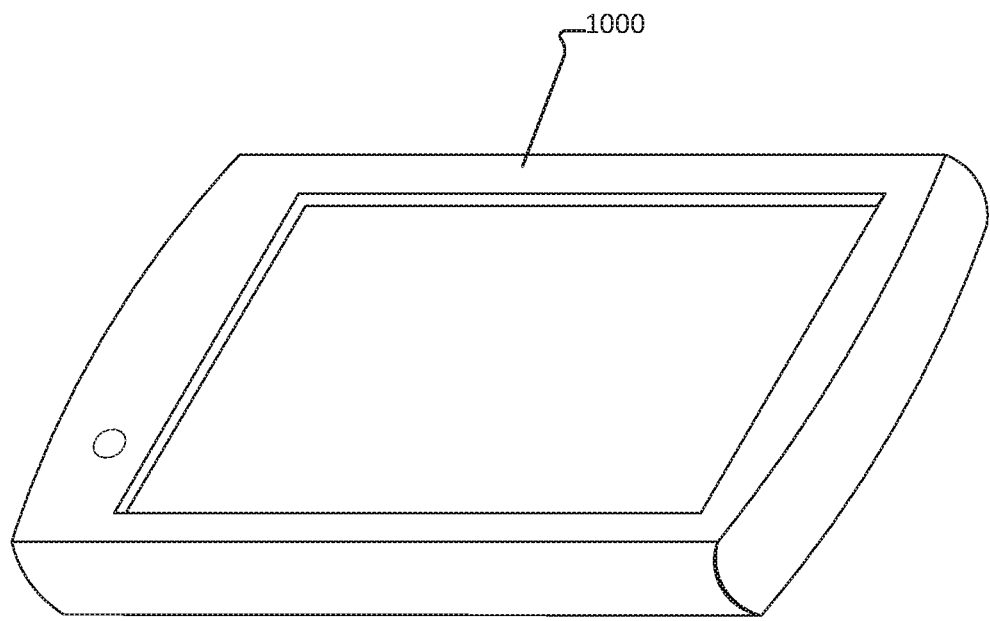
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

I claim:

1. A method for request processing at a server computer, the method comprising:
   receiving a first request from a requestor;
   receiving an indication that the first request is available in a first queue;
   in response to receiving the indication, peeking at the first request in the first queue to determine whether a worker process is capable of natively processing the request;
   processing the first request by the worker process when it is determined that the worker process is capable of natively processing the first request;
   processing the first request by the worker process;
   transmitting a response to the first request from the worker process to the requestor;
   receiving a second request from the requestor;
   forwarding the second request to a second queue for processing by a server-independent framework process when it is determined that the worker process cannot process the second request, wherein the server-independent framework process is capable of being used with a plurality of types of servers;
   processing the second request by the server-independent framework process; and
   transmitting a response to the second request from the from the server-independent framework process to the requestor.

2. The method of claim 1, wherein peeking at the first request in the first queue further comprises:
   accessing a part of the first request from the first queue; and
   reviewing the accessed part of the first request to determine whether the worker process can process the first request.

3. The method of claim 2, wherein the accessed part of the first request comprises one or more of a header, a path, an extension, and a verb.

4. The method of claim 1 wherein write access to the secondary queue is limited to the worker process.

5. The method of claim 1, further comprising determining that the worker process cannot process the request when the request is in a computer language that the worker process does not understand.

6. The method of claim 1, further comprising determining that the worker process cannot process the request when the request requires special handling.

7. The method of claim 1, further comprising restricting read-access to the second queue to the server-independent framework process.

8. The method of claim 1, wherein the worker process is capable of processing generic requests.

9. The method of claim 1, wherein the worker process is an IoT device process.

10. The method of claim 1, wherein the server-independent framework process is a vendor-specific plug-in component.

11. A computing device comprising:
a processor; and
memory storing computer-readable instructions that when executed by the processor cause the computing device to:
receive a request for a resource from a second device;
in response to receiving the request for the resource, access a portion of the request to determine whether the request should be processed by a server-independent framework process;
forwarding the request to a queue associated with the server-independent framework in response to determining that the request should be processed by the server-independent framework process, wherein the server-independent framework process is capable of being used with a plurality of types of servers; and
transmitting a response to the request from the server-independent framework process to the second device.

12. The computing device of claim 11, further comprising computer-readable instructions that when executed by the processer cause the computing device to:
process the request with a primary process when it is determined that the request should not be processed by the server-independent framework process.

13. The computing device of claim 11, wherein the computing device is a server.

14. The computing device of claim 11, wherein the computing device is an IoT device.

15. The computing device of claim 11, wherein the server-independent framework process is an IoT software plug-in.

16. The computing device of claim 11, further comprising computer-readable instructions that when executed by the processer cause the computing device to:
determine that the request should be processed by the server-independent framework process when the resource is a dynamic webpage.

17. The computing device of claim 11, further comprising computer-readable instructions that when executed by the processer cause the computing device to:
determine that request should not be processed by the server-independent framework process when the resource is a static webpage.

18. A computing device comprising:
a processor for detecting when a request for a resource has been received by the computing device;
a first queue for storing the request for the resource; and
a primary process for:
peeking at the request for the resource in the first queue to determine whether the request for the resource is associated with the primary process;
forwarding the request for the resource from the first queue to a second queue associated with a server-independent framework process in response to determining that the request for the resource is not associated with the primary process, wherein the server-independent framework process is capable of being used with a plurality of server types; and
transmitting a response to the request from the server-independent framework process to a requesting computing device.

19. The computing device of claim 18, further comprising:
a kernel mode comprising the first queue and the second queue; and
a user mode comprising the primary process.

* * * * *